(12) United States Patent
Wang et al.

(10) Patent No.: US 11,361,580 B2
(45) Date of Patent: Jun. 14, 2022

(54) SCREEN MODULE TO DETERMINE AN IMAGE USING A LIGHT REFLECTING STRUCTURE AND ELECTRONIC DEVICE PROVIDED WITH SCREEN MODULE

(71) Applicant: HUAWEI TECHNOLOGIES CO., LTD., Shenzhen (CN)

(72) Inventors: Fan Wang, Hangzhou (CN); Honghai Zhang, Hangzhou (CN); Wenxiong Wei, Hangzhou (CN); Ao Shen, Grenoble (FR); Yi Hu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/938,897

(22) Filed: Jul. 24, 2020

(65) Prior Publication Data

US 2020/0356748 A1    Nov. 12, 2020

Related U.S. Application Data

(63) Continuation of application No. PCT/CN2018/112063, filed on Oct. 26, 2018.

(30) Foreign Application Priority Data

Jan. 30, 2018   (CN) .......................... 201810089596.5

(51) Int. Cl.
*G06V 40/13*    (2022.01)
*G06F 1/16*    (2006.01)
(Continued)

(52) U.S. Cl.
CPC ........ *G06V 40/1318* (2022.01); *G06F 1/1637* (2013.01); *H01L 27/3234* (2013.01);
(Continued)

(58) Field of Classification Search
CPC ........ G06K 9/0004; G06K 9/00; G06F 3/042; G06F 3/0421; G02F 1/136209; H01L 27/14623; H01L 29/78633
See application file for complete search history.

(56) References Cited

U.S. PATENT DOCUMENTS 6,429,927 B1   8/2002  Borza
9,570,002 B2   2/2017  Sakariya et al.
(Continued)

FOREIGN PATENT DOCUMENTS

CN    101964058 A    2/2011
CN    103713448 A    4/2014
(Continued)

*Primary Examiner* — Yuzhen Shen
(74) *Attorney, Agent, or Firm* — Stein IP, LLC

(57) ABSTRACT

A screen module includes an external screen, a first light blocking layer, a substrate, and a reflection layer that are disposed from outside to inside. An imaging unit array is disposed on the substrate, the imaging unit array includes a plurality of imaging units), and a photosensitive surface of the imaging unit is opposite to the reflection layer. A first aperture array is disposed on the first light blocking layer, the first aperture array includes a plurality of first apertures, and the first aperture is used to allow light reflected by an object outside the screen to the reflection layer to pass through. The reflection layer is configured to reflect, to the imaging unit, the light passing through the first aperture. Thus, user convenience can be improved.

20 Claims, 11 Drawing Sheets

(51) Int. Cl.
  *H01L 27/32* (2006.01)
  *H01L 51/52* (2006.01)
  *H04M 1/02* (2006.01)

(52) U.S. Cl.
  CPC ...... *H01L 51/5271* (2013.01); *H01L 51/5284* (2013.01); *H04M 1/026* (2013.01)

(56) References Cited

U.S. PATENT DOCUMENTS

| | | | |
|---|---|---|---|
| 2011/0058075 A1* | 3/2011 | Yanagita | H01L 27/14621 348/273 |
| 2013/0119237 A1 | 5/2013 | Raguin et al. | |
| 2015/0131035 A1* | 5/2015 | Chen | G02B 1/11 349/96 |
| 2016/0132712 A1 | 5/2016 | Yang et al. | |
| 2016/0174847 A1* | 6/2016 | Tsuchiya | A61B 5/6824 600/476 |
| 2017/0161540 A1* | 6/2017 | Mienko | G06K 9/00073 |
| 2017/0161543 A1* | 6/2017 | Smith | G06K 9/0004 |
| 2017/0161544 A1 | 6/2017 | Fomani et al. | |
| 2017/0270342 A1 | 9/2017 | He et al. | |
| 2019/0251326 A1 | 8/2019 | Sun | |

FOREIGN PATENT DOCUMENTS

| | | | | |
|---|---|---|---|---|
| CN | 104425519 A | 3/2015 | | |
| CN | 204613454 U | 9/2015 | | |
| CN | 105242443 A | 1/2016 | | |
| CN | 105868742 A | 8/2016 | | |
| CN | 205910951 U | 1/2017 | | |
| CN | 107103307 A | 8/2017 | | |
| CN | 107330426 A | 11/2017 | | |
| CN | 107590428 A | 1/2018 | | |
| CN | 108258017 A | * | 7/2018 | ............ H01L 27/32 |
| WO | 2017058473 A1 | 4/2017 | | |

* cited by examiner

SCREEN MODULE TO DETERMINE AN IMAGE USING A LIGHT REFLECTING STRUCTURE AND ELECTRONIC DEVICE PROVIDED WITH SCREEN MODULE

CROSS-REFERENCE TO RELATED APPLICATIONS

This application is a continuation of International Application No. PCT/CN2018/112063, filed on Oct. 26, 2018, which claims priority to Chinese Patent Application No. 201810089596.5, filed on Jan. 30, 2018, The disclosures of the aforementioned applications are hereby incorporated by reference in their entireties.

TECHNICAL FIELD

Aspects of this application relates to the computer field, and in particular, to a screen module and an electronic device provided with a screen module.

BACKGROUND

To improve security of terminal devices, many terminal devices are provided with a fingerprint sensor. Currently, the fingerprint sensor is usually disposed at a lower part of a front panel of the terminal device or on the back of the terminal device, having a disadvantage of occupying display screen space or being inconvenient to use. Therefore, how to dispose the fingerprint sensor at a lower layer of a touchscreen is an important subject in the art.

Referring to FIG. 1, a display screen is provided in the prior art, including an external screen, a light emitting board, and an optical-to-electrical conversion unit. The light emitting board has light emitting units and a circuit network connecting the light emitting units to each other. Light emitted by the light emitting units is projected to the external screen. The circuit network separates the light emitting board into a plurality of gaps. A light blocking layer is disposed below the light emitting board, and the light blocking layer has a light transmission hole. The gaps and the light transmission hole form a light path. The light emitted by the light emitting units is reflected by an object (such as a finger) on or outside the external screen, and then irradiates the optical-to-electrical conversion unit after passing through the light path, thereby implementing an image acquisition function.

Based on an aperture imaging principle, a specific distance needs to be maintained between the optical-to-electrical conversion unit and the light emitting board, so that the light reflected by the object can form a clear image in the optical-to-electrical conversion unit. Consequently, the display screen is relatively thick, and a terminal device provided with the display screen is also relatively thick, causing inconvenience in holding the terminal device.

SUMMARY

In view of this, aspects of this application provides a screen module, to collect an image by using a light reflection structure in the screen module, thereby reducing a thickness of a display screen and improving use convenience of a user.

According to a first aspect, a screen module is provided, including: an external screen, a first light blocking layer, a substrate, and a reflection layer that are disposed from outside to inside. An imaging unit array is disposed on the substrate, the imaging unit array includes a plurality of imaging units, and a photosensitive surface of the imaging unit is opposite to the reflection layer. The first light blocking layer is provided with a first aperture array, the first aperture array includes a plurality of first apertures, and the first aperture is used to allow light reflected by an object outside the external screen to the reflection layer to pass through. The reflection layer is configured to reflect, to the imaging unit, the light passing through the first aperture. In this way, the light from the object is reflected by the reflection layer, and imaging is performed on the imaging unit array, so that space required for the imaging can be reduced, thereby implementing short-distance imaging. Therefore, the screen module in this aspect is thinner, so that a terminal device is thinner and easier to hold.

In a possible implementation, the screen module further includes a light emitting pixel array disposed on the substrate, and the light emitting pixel array includes a plurality of light emitting pixels; and the first light blocking layer is further provided with a second aperture array, the second aperture array includes a plurality of second apertures, and each second aperture is provided in correspondence to the light emitting pixel, and is used to allow light emitted by the light emitting pixel to the external screen to pass through. In this way, light emitting of the light emitting pixel array may be controlled by using a display control circuit. The light produced by the light emitting pixel array is more stable than ambient light. When the light of the light emitting pixel array irradiates the object outside the external screen, the object can scatter more light, so that the imaging unit can receive more light, thereby achieving a better imaging effect.

In another possible implementation, a second light blocking layer is disposed between the substrate and the reflection layer, the second light blocking layer includes a light transmission area array, each light transmission area in the light transmission area array includes a third aperture and a fourth aperture; the third aperture is aligned with the first aperture, and the third aperture is used to allow the light passing through the first aperture to pass through; and the fourth aperture is used to allow the light reflected by the reflection layer to the imaging unit to pass through. In this way, the second light blocking layer may block a part of light entering the substrate from the reflection layer, to prevent the light reflected by the reflection layer from irradiating a top-gate structure of a thin-film transistor (TFT) substrate, thereby avoiding abnormal light emission caused by reflected light.

In another possible implementation, an isolation layer is disposed between the reflection layer and the substrate, and grid boxes of the isolation layer are in a one-to-one correspondence with the imaging units; and the grid boxes are made of an opaque material and are configured to isolate light received by the different imaging units. In this way, crosstalk of the light reflected by the reflection layer to the imaging unit can be prevented, thereby resolving a problem of unclear imaging caused by the crosstalk of the light.

In another possible implementation, a transparent polymer is filled inside each grid box. In this way, the transparent polymer may be used as a support, so that the isolation layer can fit the substrate.

In another possible implementation, a ratio of a distance from the first light blocking layer to the external screen to a distance from the second light blocking layer to the reflection layer ranges from 1 to 40. According to this implementation, a better imaging effect can be achieved.

In another possible implementation, a density of the imaging unit on the substrate is greater than 200 pixels per inch (PPI).

According to a second aspect, a screen module is provided, including: an external screen, a first light blocking layer, a substrate, a second light blocking layer, and a reflection layer that are disposed from outside to inside. An imaging unit array is disposed on an outer surface of the substrate, the imaging unit array includes a plurality of imaging units, and a photosensitive surface of the imaging unit is opposite to the reflection layer. A surface of the first light blocking layer has a light blocking area including a lightproof material, and the light blocking area is used to block light emitted from the outside to the imaging unit. The second light blocking layer is disposed between the substrate and the reflection layer, the second light blocking layer includes a light transmission area array, each light transmission area in the light transmission area array includes a first aperture and a second aperture, the first aperture is used to allow light reflected by an object outside the external screen to the reflection layer to pass through, and the second aperture is used to allow light reflected by the reflection layer to the imaging unit to pass through. The reflection layer is configured to reflect, to the imaging unit, the light passing through the first aperture. In this way, an aperture in the second light blocking layer is used as a hole for aperture imaging, the light from the object is reflected by the reflection layer, and imaging is performed on the imaging unit array, so that space required for the imaging can be reduced, thereby implementing short-distance imaging. Therefore, the screen module in this application is thinner, so that a terminal device is thinner and easier to hold.

In a possible implementation, the screen module further includes a light emitting pixel array disposed on the substrate, and the light emitting pixel array includes a plurality of light emitting pixels. When light of the light emitting pixel array irradiates the object outside the external screen, the object can scatter more light, so that the imaging unit can receive more light, thereby achieving a better imaging effect.

In another possible implementation, an isolation layer is disposed between the reflection layer and the second light blocking layer, and grid boxes of the isolation layer are in a one-to-one correspondence with light transmission areas; and the grid boxes are made of an opaque material and are configured to isolate light received by the different imaging units. In this way, crosstalk of the light reflected by the reflection layer to the imaging unit can be prevented, thereby resolving a problem of unclear imaging caused by the crosstalk of the light.

In another possible implementation, a ratio of a distance from the first light blocking layer to the external screen to a distance from the second light blocking layer to the reflection layer ranges from 1 to 40.

According to a third aspect, an electronic device is provided. The electronic device includes the screen module according to the first aspect or the possible implementations of the first aspect.

According to a fourth aspect, an electronic device is provided. The electronic device includes the screen module according to the second aspect or the possible implementations of the second aspect.

It can be learned from the foregoing embodiments that the screen module in this application includes the external screen, the first light blocking layer, the substrate, and the reflection layer that are disposed from outside to inside. The imaging unit array is disposed on the substrate, and the photosensitive surface of the imaging unit is opposite to the reflection layer. The first light blocking layer is provided with a first aperture array, the first aperture array includes the plurality of first apertures, and the first aperture is used to allow the light reflected by the object outside the screen to the reflection layer to pass through. The reflection layer is configured to reflect, to the imaging unit, the light passing through the first aperture. In this way, the light from the object is reflected by the reflection layer, and imaging is performed on a photodetector, so that the space required for the imaging can be reduced, thereby implementing the short-distance imaging. It can be learned that the screen module in this application is thinner, so that a thickness of the terminal device is reduced, and the terminal device is easier to hold.

DESCRIPTION OF EMBODIMENTS

A screen module provided in this application may be applied to various devices having a display function, and may specifically be a computer device, and more specifically, may be a terminal device, for example, a mobile phone, a tablet computer, a wearable device, a vehicle-mounted computer, or a self-service terminal.

Figure 1:
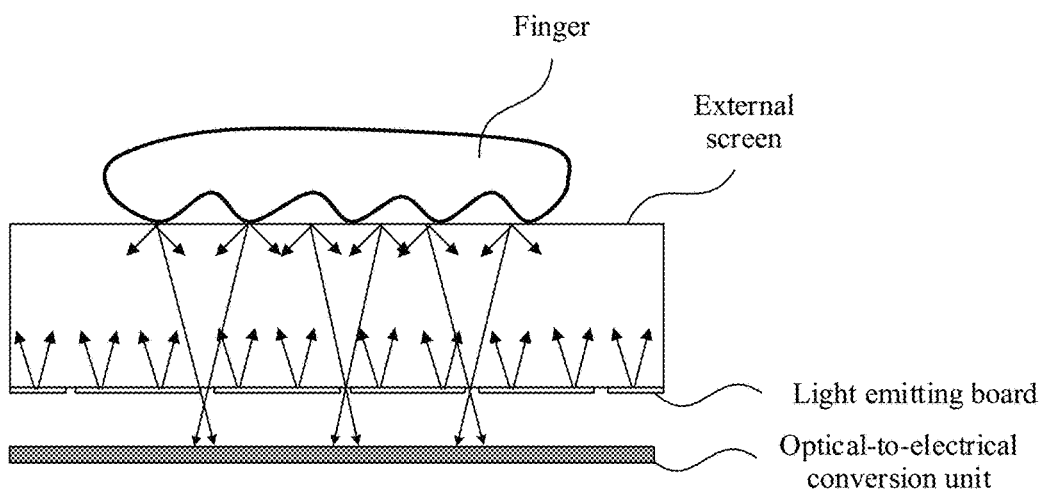
FIG. 1 is a schematic diagram of a display screen in the prior art.
Figure 2:
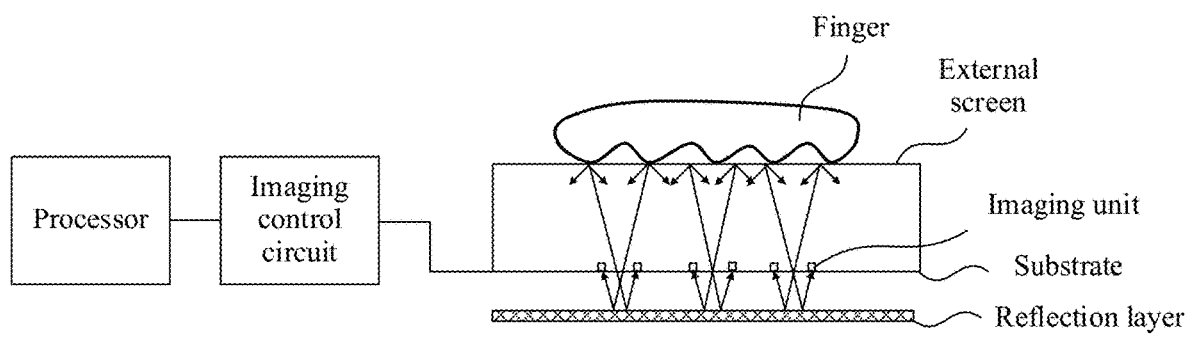
FIG. 2 is a schematic diagram of an imaging principle according to an embodiment of this application.

First, an imaging principle in this application is described. FIG. 2 is a schematic diagram of an imaging principle according to this application. A terminal device includes a processor, an imaging control circuit, and a screen module. The screen module includes an external screen, a substrate, and a reflection layer. An imaging unit array is integrated into the substrate. The imaging unit array is connected to the imaging control circuit. The imaging control circuit may be integrated into the substrate of the screen module, or may be disposed on a mainboard.

When a finger of a user approaches or touches the external screen, under irradiation of ambient light, light scattered by the finger passes through an aperture on the substrate to reach the reflection layer, and then is reflected to the imaging unit array. The imaging control circuit obtains an image signal collected by the imaging unit array, and transmits the image signal to the processor, for example, a central processing unit (CPU). The processor can implement functions such as fingerprint recognition, gesture recognition, ambient light detection, and distance detection based on a user requirement.

Figure 3:
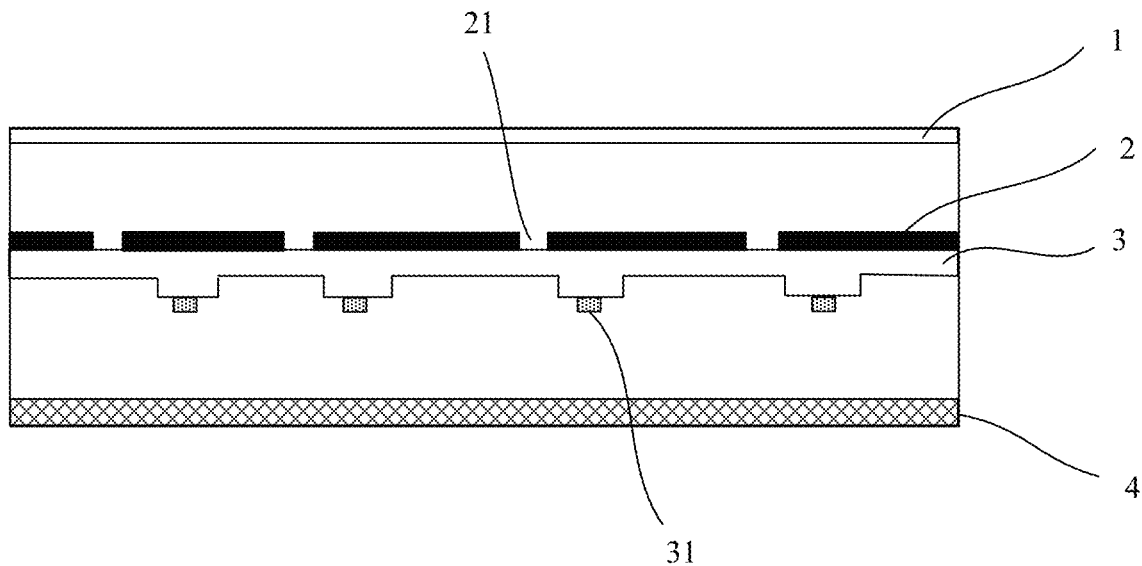
FIG. 3 is a schematic diagram of a screen module according to an embodiment of this application.

Referring to FIG. 3, an embodiment of a screen module provided in this application includes an external screen 1, a first light blocking layer 2, a substrate 3, and a reflection layer 4 that are disposed from outside to inside.

The external screen 1 is made of a light transmission material, for example, resin or glass. The external screen 1 is a screen layer located at an outermost layer, for example, a touchscreen or a protective screen.

Figure 4:
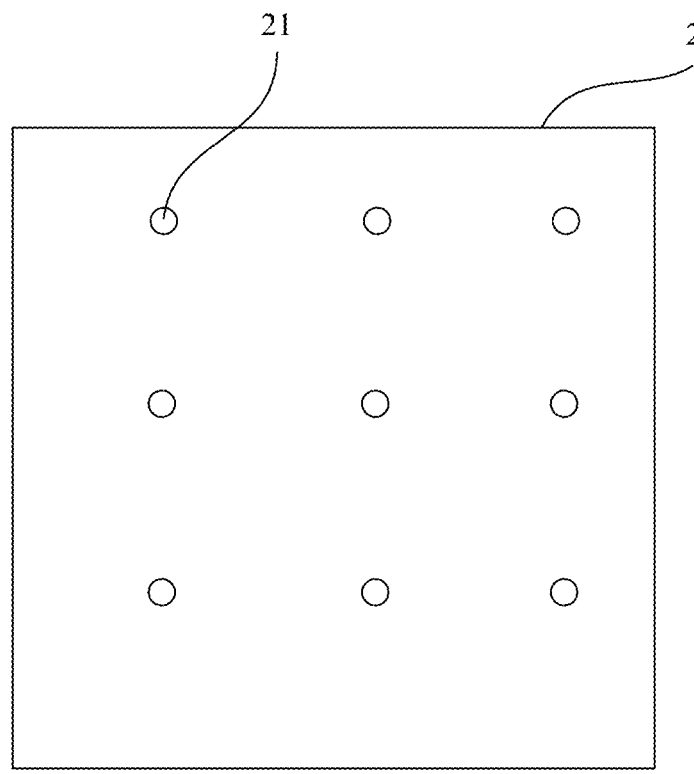
FIG. 4 is a schematic diagram of a first light blocking layer according to an embodiment of this application.

FIG. 4 is a top view of the first light blocking layer 2 in FIG. 3. The first light blocking layer 2 is provided with a first aperture array, the first aperture array includes a plurality of first apertures 21, and the first aperture 21 is used to allow light reflected by an object outside the external screen 1 to the reflection layer 4 to pass through. The shape of the first aperture may be but is not limited to a square, a circle, or a star. When the first aperture is circular, a diameter of the first aperture may be set based on an actual requirement, for example, between 2 micrometers and 30 micrometers.

Figure 6A:
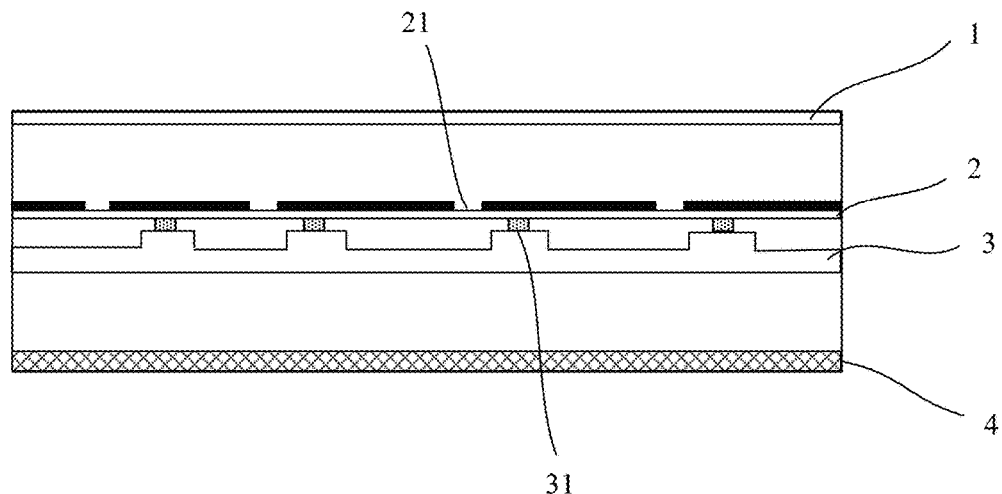
FIG. 6a is another schematic diagram of a screen module according to an embodiment of this application.

An imaging unit array is disposed on the substrate 3, the imaging unit array includes a plurality of imaging units 31, and a photosensitive surface of the imaging unit 31 is opposite to the reflection layer 4. The imaging unit 31 may be disposed near a lower surface of the substrate 3 (as shown in FIG. 3). In another implementation, the imaging unit 31 may be disposed in a gap of the substrate 3 (as shown in FIG. 6a).

The imaging unit 31 may be a photodetector (PD), and may specifically include a silicon detector and a photosensitive material. A density of the imaging unit on the substrate 3 may be set based on an actual situation, for example, 200 pixels per inch (PPI), 500 PPI, or 1000 PPI. A higher density of the imaging unit indicates a higher resolution of a generated image. When a density of the image unit is greater than 200 PPI, a resolution of the generated image is greater than 200 PPI. When a density of the image unit is greater than 500 PPI, a resolution of the generated image is greater than 500 PPI.

The substrate 3 may be a thin-film transistor (TFT) substrate, and a material of the TFT substrate is resin or glass. When a soft screen is made, a polyethylene terephthalate (PET) material may be selected to make the TFT substrate. When a hard screen is made, a glass material may be selected to make the TFT substrate.

The reflection layer 4 is configured to reflect, to the imaging unit 31, the light passing through the first aperture 21. The reflection layer may be a thin metal film or a metal coating.

In this embodiment, when ambient light irradiates the object outside the external screen 1, light scattered by the object passes through the first aperture 21 of the first light blocking layer 2 to reach the internal reflection layer 4, and then is reflected by the reflection layer 4 to reach the imaging unit 31. The imaging unit 31 receives the light of the object for imaging. In this way, each imaging unit may form a partial image of the object based on a part of the light reflected by the object, and the imaging unit array may form a high-definition image of the entire object based on partial images of the object formed by various imaging units. When the object is a finger, the screen module may obtain a fingerprint of the finger, to perform a fingerprint recognition function. In addition, the screen module may further implement functions such as gesture recognition, proximity detection, and ambient light detection.

In this way, the light from the object is reflected by the reflection layer, and imaging is performed on the imaging unit array, so that space required for the imaging can be reduced, thereby implementing short-distance imaging. Therefore, the screen module in this application is thinner, so that a terminal device is thinner and easier to hold.

Figure 5:
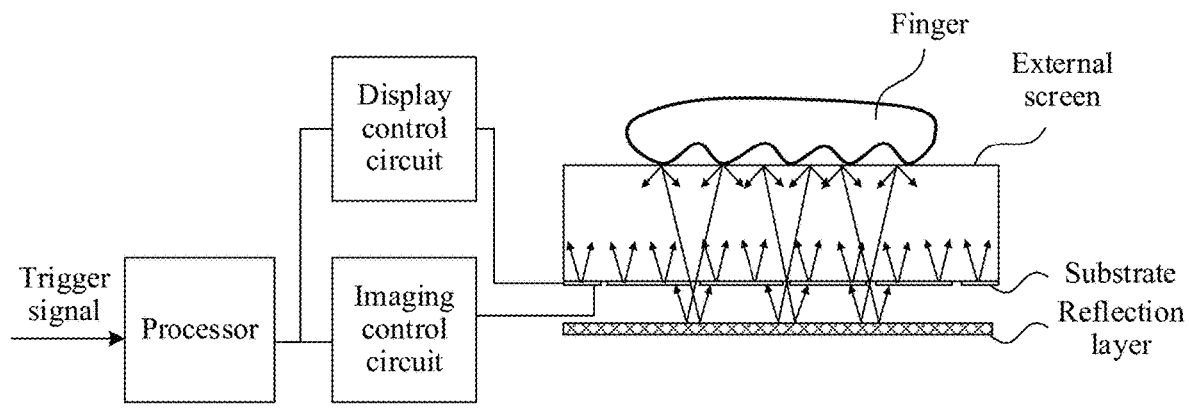
FIG. 5 is another schematic diagram of an imaging principle according to an embodiment of this application.

The foregoing describes a case in which the imaging unit performs the imaging based on the light scattered by the finger under irradiation of the ambient light. In addition, in an aspect of this application, a light emitting body may be further disposed in the screen module, light emitted by the light emitting body irradiates the finger, and the imaging unit performs imaging based on light scattered by the finger. The following describes an imaging principle in this application. FIG. 5 is another schematic diagram of an imaging principle according to this application. A terminal device includes a processor, a display control circuit, an imaging control circuit, and a screen module. The screen module includes an external screen, a substrate, and a reflection layer. In addition to an imaging unit array, a light emitting pixel array is further integrated into the substrate.

A finger of a user performs a touch operation on the external screen, for example, pressing, touching, sliding, or gesture control. The screen module responds to the touch operation, and sends a trigger signal to the processor. The processor sends a control signal to the display control circuit based on the trigger signal, to control the light emitting pixel array in the substrate to emit light as required, for example, emit light in a specified screen area, emit light in specified luminance, or emit light for specified duration. Because the light of the light emitting pixel array is controlled by the processor, the light emitting pixel array can be used as a more stable light source. The reflection layer reflects, to the imaging unit array in the substrate, light from the finger, and the imaging control circuit obtains an image signal collected by the imaging unit array, and transmits the image signal to the processor. The processor can implement functions such as fingerprint recognition, gesture recognition, ambient light detection, and distance detection based on a user requirement.

Figure 6B:
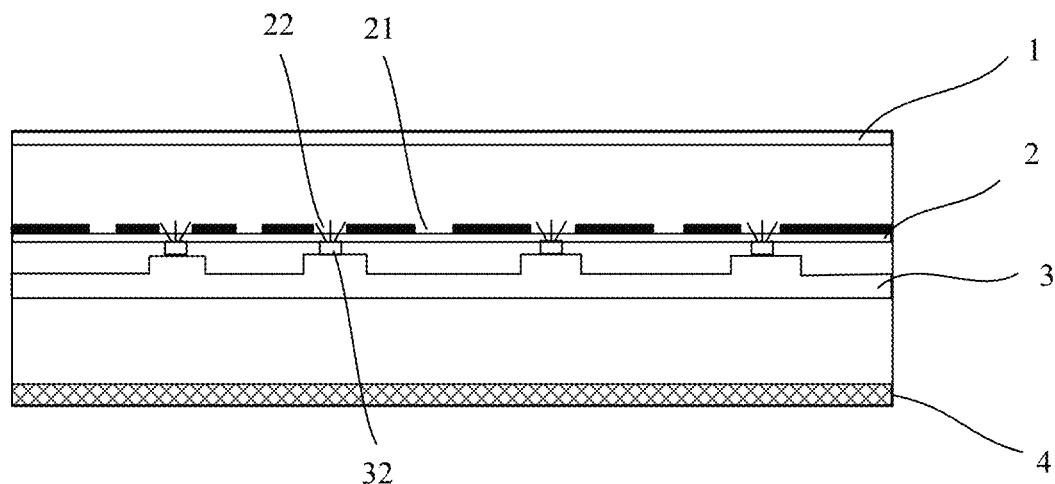
FIG. 6b is another schematic diagram of a screen module according to an embodiment of this application.

A light emitting pixel and an imaging unit may be disposed in a staggered manner in the substrate. A cross section of the screen module includes only the light emitting pixel or includes only the imaging unit. The following separately describes a structure of a screen module by using two cross sections. FIG. 6a is a schematic sectional view including an imaging unit 31, and FIG. 6b is a schematic sectional view including a light emitting pixel 32. When FIG. 6a is a schematic transverse sectional view, FIG. 6b is a schematic longitudinal sectional view. Alternatively, when FIG. 6a is a schematic longitudinal sectional view, FIG. 6b is a schematic transverse sectional view. In addition, FIG. 6a and FIG. 6b further show an external screen 1, a first light blocking layer 2, a substrate 3, a reflection layer 4, and a first aperture 21. For details, refer to the foregoing embodiments. As shown in FIG. 6b, a second aperture array is further disposed on the first light blocking layer 2, and the second aperture array includes a plurality of second apertures 22.

Figure 7:
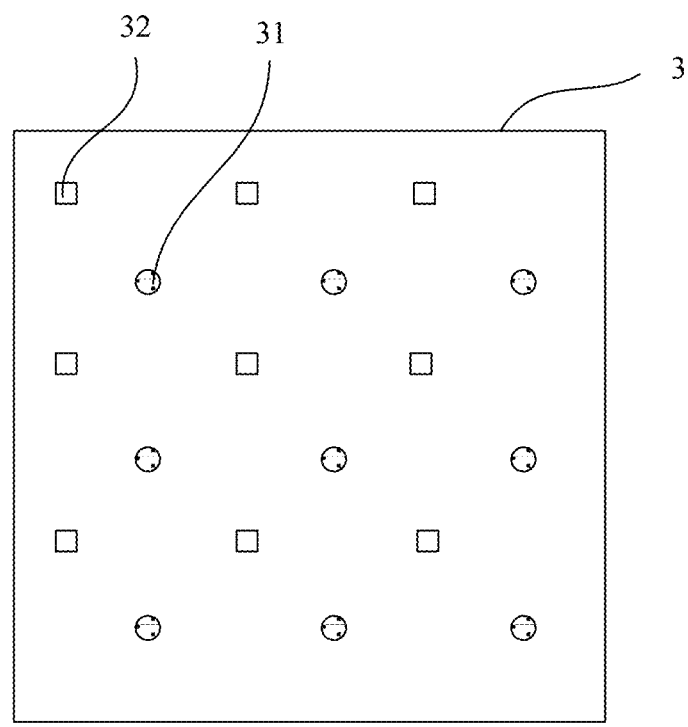
FIG. 7 is a schematic diagram of a substrate according to an embodiment of this application.

FIG. 7 is a top view of the substrate 3 in FIG. 6a and FIG. 6b. A light emitting pixel array and an imaging unit array are disposed on the substrate 3, the imaging unit array includes a plurality of imaging units 31, the light emitting pixel array includes a plurality of light emitting pixels 32, and a photosensitive surface of the imaging unit 31 is opposite to the reflection layer 4.

Optionally, the substrate 3 may be a thin-film transistor (TFT) substrate, and a material of the TFT substrate is resin or glass. When a soft screen is made, a polyethylene terephthalate (PET) material may be selected to make the TFT substrate. When a hard screen is made, a glass material may be selected to make the TFT substrate. After a light emitting material is added to the TFT substrate, a light emitting pixel structure may be implemented.

The light emitting pixel 32 may be at least one of an organic light emitting diode (OLED), a quantum dot light emitting diode (QLED), or a micro light emitting diode (microLED).

The imaging unit 31 may be a photodetector (PD), and may specifically include a silicon detector and a photosensitive material. A density of the imaging unit on the substrate 3 may be set based on an actual situation, for example, 200 pixels per inch (PPI), 500 PPI, or 1000 PPI. A higher density of the imaging unit indicates a higher resolution of a generated image. When a density of the image unit is greater than 200 PPI, a resolution of the generated image is greater than 200 PPI. When a density of the image unit is greater than 500 PPI, a resolution of the generated image is greater than 500 PPI. It should be noted that a density of the light emitting pixel 32 may be the same as or different from the density of the imaging unit 31.

Figure 8:
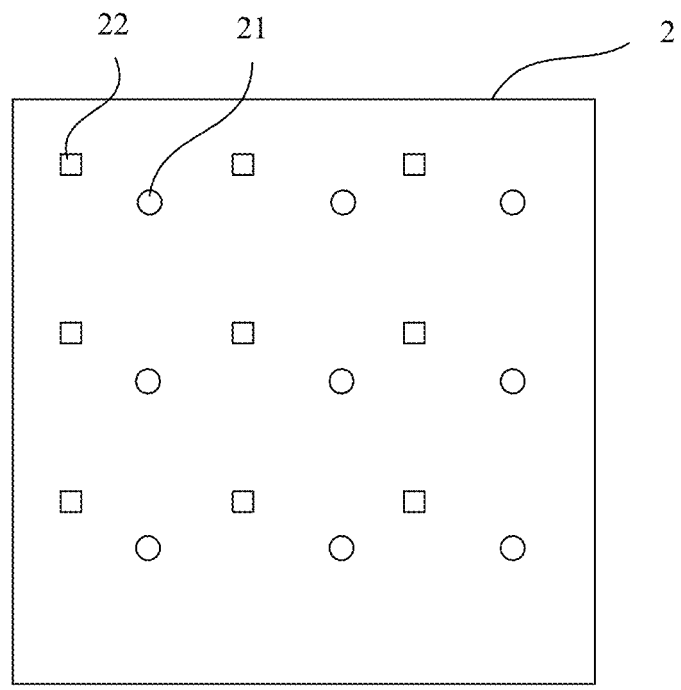
FIG. 8 is a top view of a first light blocking layer according to an embodiment of this application.

Referring to FIG. 8, a first light blocking layer 2 is provided with a first aperture array and a second aperture array. The second aperture array includes a plurality of second apertures 22, and each second aperture 22 is provided in correspondence to a light emitting pixel 32. Specifically, the second aperture 22 may be provided at a position facing the light emitting pixel 32. The second aperture 22 is used to allow light emitted by the light emitting pixel 32 to an external screen 1 to pass through.

Figure 9:
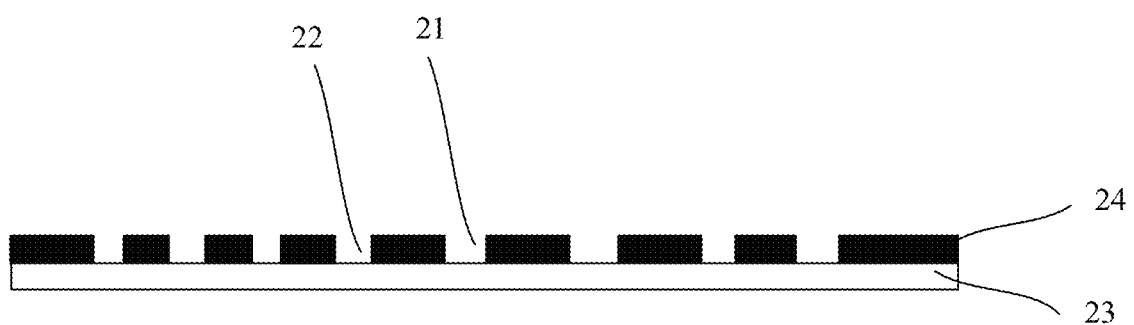
FIG. 9 is a side view of a first light blocking layer according to an embodiment of this application.

FIG. 9 is a side view of the first light blocking layer 2. In an optional embodiment, the first light blocking layer 2 includes a buffer layer 23 and a thin metal film 24 covering a surface of the buffer layer 23, and etching is performed on the thin metal film 24 to form the first aperture 21 and the second aperture 22. The thin metal film 24 is configured to block the light emitted by the light emitting pixel 32 to the external screen 1, to implement a light blocking function. The buffer layer 23 is made of a polymer material or silicon dioxide $SiO_2$, and the buffer layer 23 is transparent to light. It may be understood that a light blocking material of the first light blocking layer 2 may alternatively be another lightproof material.

The first aperture array includes a plurality of first apertures 21, and the first aperture 21 is used to allow light reflected by an object outside the external screen 1 to a reflection layer 4 to pass through. Specifically, most of light passing through each first aperture 21 is reflected to an imaging unit 31 corresponding to the first aperture 21. The shape of the first aperture may be but is not limited to a square, a circle, or a star. When the first aperture is circular, a diameter of the first aperture may be set based on an actual requirement, for example, between 2 micrometers and 30 micrometers.

The reflection layer 4 is configured to reflect, to the imaging unit 31, the light passing through the first aperture 21.

It may be understood that a substrate 3 may further include a display control circuit and an imaging control circuit. The display control circuit is electrically connected to a light emitting pixel array, and the imaging control circuit is electrically connected to an imaging unit array. A gap corresponding to the first aperture 21 exists between circuits of the substrate, as shown in FIG. 6a. After passing through the first aperture 21, the light reflected by the object outside the external screen 1 reaches the reflection layer 4 through the gap corresponding to the first aperture 21. It should be noted that the light emitting pixel array and the imaging unit array in this application may be at different layers, and may also be at different planes.

In this embodiment, when there is an object (such as a finger or a stylus) on a surface of the external screen 1 or outside the external screen, because the external screen 1 is transparent to light, the light emitted by the light emitting pixel 32 may reach the object on the surface or outside the external screen 1 through the second aperture 22. In this case, light emitted by the light emitting pixel array is similar to light emitted by a Lambert body, and irradiates the finger, and the finger scatters the light. A part of the light scattered by the finger passes through the first aperture 21 of the first light blocking layer 2 to reach the internal reflection layer 4, and the light reflected by the reflection layer 4 reaches the imaging unit 31. In this way, each imaging unit may form a partial image of the object based on a part of the light reflected by the object, and the imaging unit array may form a high-definition image of the entire object based on partial images of the object formed by various imaging units. When the object is the finger, the screen module may obtain a fingerprint of the finger, to perform a fingerprint recognition function. In addition, the screen module may further implement functions such as gesture recognition, proximity detection, and ambient light detection.

In this way, the light from the object is reflected by the reflection layer, and imaging is performed on a photodetector, so that space required for the imaging can be reduced, thereby implementing short-distance imaging. It can be learned that compared with the prior art, the screen module in this application is thinner, so that the thickness of a terminal device is reduced, and the terminal device is easier to hold.

Figure 10A:
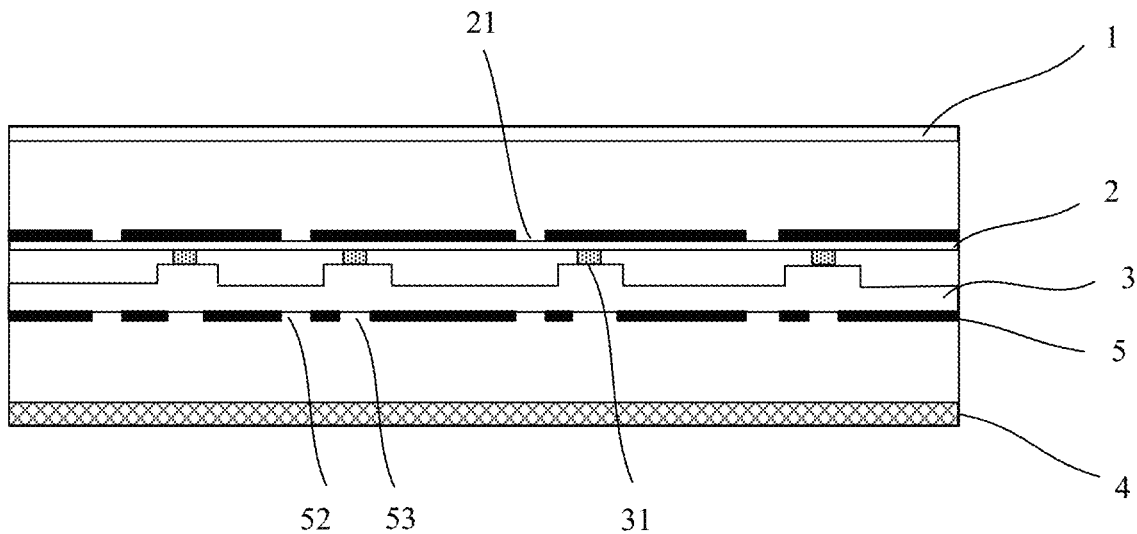
FIG. 10a is another schematic diagram of a screen module according to an embodiment of this application.
Figure 10B:
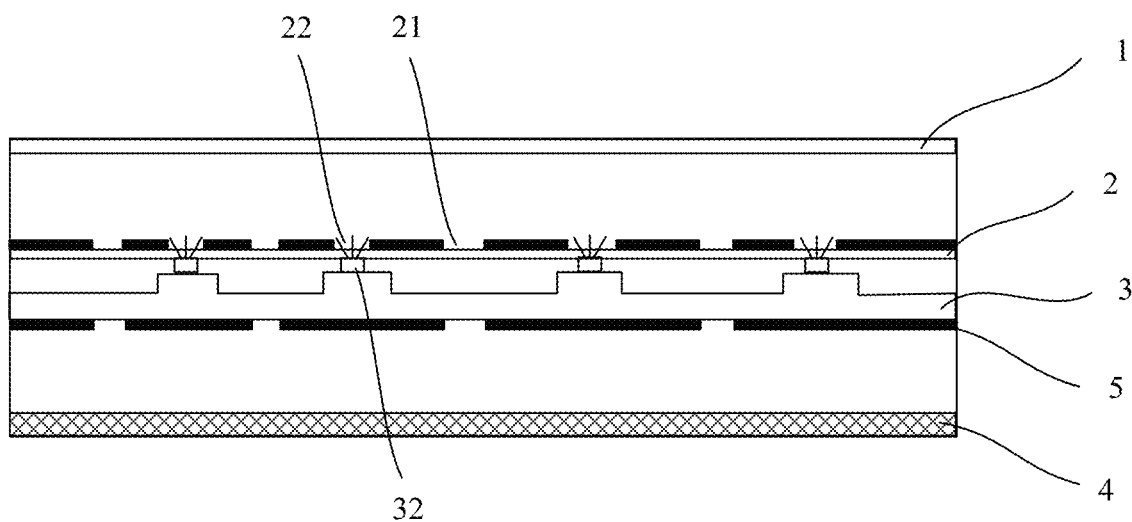
FIG. 10b is another schematic diagram of a screen module according to an embodiment of this application.

When the substrate 3 is a TFT substrate, the light reflected by the reflection layer irradiates a top-gate structure of the TFT substrate. This causes abnormal light emission. To resolve this problem, in this application, a second light blocking layer is disposed below the substrate, to prevent the light reflected by the reflection layer from irradiating the top-gate structure of the TFT substrate. FIG. 10a is a schematic sectional view including an imaging unit 31, and FIG. 10b is a schematic sectional view including a light emitting pixel 32. When FIG. 10a is a schematic transverse sectional view, FIG. 10b is a schematic longitudinal sectional view. Alternatively, when FIG. 10a is a schematic longitudinal sectional view, FIG. 10b is a schematic transverse sectional view. Specifically, referring to FIG. 10a and FIG. 10b, another embodiment of a screen module provided in this application includes an external screen 1, a first light blocking layer 2, a substrate 3, a reflection layer 4, and a second light blocking layer 5 that are disposed from outside to inside.

For specific descriptions of the external screen 1, the first light blocking layer 2, the substrate 3, and the reflection layer 4, refer to descriptions in the embodiments shown in FIG. 2 to FIG. 9. The second light blocking layer 5 is disposed between the substrate 3 and the reflection layer 4. The second light blocking layer may be formed by disposing a light blocking material below a water-oxygen blocking layer of the TFT substrate. The light blocking material may be a thin metal film or another lightproof material.

Figure 11:
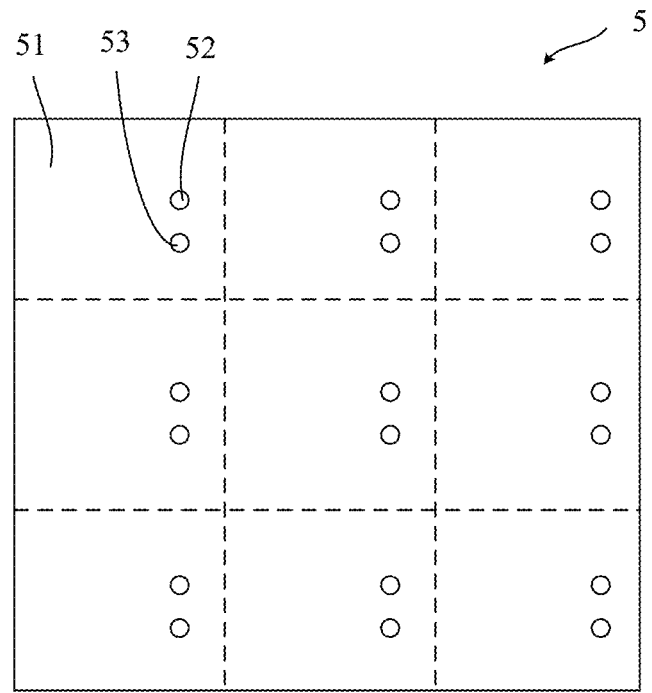
FIG. 11 is a schematic diagram of a second light blocking layer according to an embodiment of this application.

Referring to FIG. 11, the second light blocking layer 5 includes a light transmission area array, and each light transmission area 51 in the light transmission area array includes a third aperture 52 and a fourth aperture 53. The third aperture 52 is aligned with a first aperture 21, and the third aperture 52 is used to allow light passing through the first aperture 21 to pass through. An aperture structure includes the first aperture 21 and the third aperture 52. Light reflected by an object outside the external screen 1 passes through the aperture structure, and is reflected by the reflection layer 4, so that aperture imaging can be implemented on the imaging unit 31. The fourth aperture 53 is used to allow the light reflected by the reflection layer 4 to the imaging unit 31 to pass through. Specifically, the fourth aperture 52 is provided at a position facing the imaging unit 31.

The light transmission area 51 is an area unit including the third aperture 52 and the fourth aperture 53 in the second light blocking layer 5, and the shape of the light transmission area 51 is not limited to a rectangle, an ellipse, or a circle. The shape of the third aperture 52 or the fourth aperture 53 may be but is not limited to a square, a circle, or a star. When the third aperture 52 is circular, a diameter of the third aperture ranges from 2 micrometers to 30 micrometers. When the third aperture 52 is of a square, a side length of the third aperture ranges from 2 micrometers to 30 micrometers.

It should be noted that a light emitting pixel array may alternatively not be disposed on the substrate 3 of the screen module in this application. When ambient light irradiates the object outside the external screen 1, the object may pass the light through the first aperture 21 of the first light blocking layer and the third aperture 52 of the second light blocking layer to reach the reflection layer 4. After being reflected by the reflection layer 4, the light may pass through the fourth aperture 53 of the second light blocking layer 5 to reach the imaging unit 31, and the imaging unit 31 receives the light of the object for imaging.

In this embodiment, when there is an object (such as a finger or a stylus) on a surface of the external screen 1 or outside the external screen 1, because the external screen 1 is transparent to light, light emitted by the light emitting pixel 32 may reach the object on the surface or outside the external screen 1 through the second aperture 22. In this case, light emitted by the light emitting pixel array is similar to light emitted by a Lambert body, and irradiates the finger, and the finger scatters the light. A part of the light scattered by the finger sequentially passes through the first aperture 21 of the first light blocking layer 2 and the third aperture 52 of the second light blocking layer 5 to reach the internal reflection layer 4, and the light reflected by the reflection layer 4 passes through the fourth aperture 53 to reach the imaging unit 31. In this way, each imaging unit 31 may form a partial image of the object based on a part of the light reflected by the object, and the imaging unit array may form a high-definition image of the entire object based on partial images of the object formed by various imaging units.

In addition, the second light blocking layer 5 may block a part of light entering the substrate 3 from the reflection layer 4, to prevent the light reflected by the reflection layer 4 from irradiating a top-gate structure of the TFT substrate, thereby avoiding abnormal light emission caused by reflected light.

Figure 12:
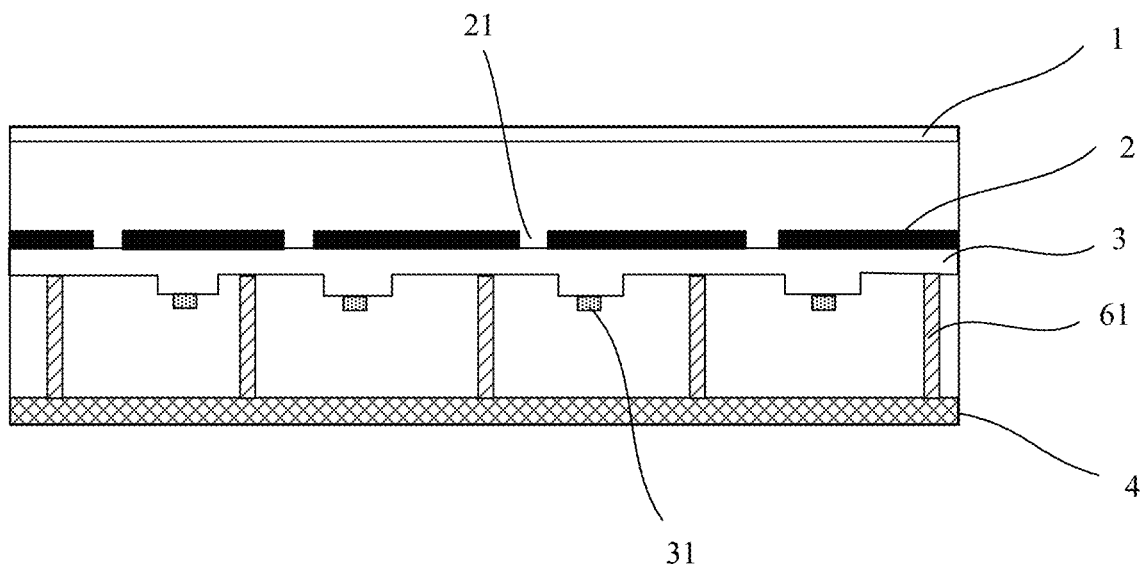
FIG. 12 is another schematic diagram of a screen module according to an embodiment of this application.

Because the light is scattered by the finger, fingerprint reflection light at a same position may be collected by a plurality of imaging units. This causes a blurry image. To resolve this problem, in this application, an isolation layer is disposed between the substrate and the reflection layer, to prevent crosstalk of the light reflected by the reflection layer. Specifically, referring to FIG. 12, another embodiment of a screen module provided in this application includes:

an external screen 1, a first light blocking layer 2, a substrate 3, a reflection layer 4, and an isolation layer 6 that are disposed from outside to inside.

For specific descriptions of the external screen 1, the first light blocking layer 2, the substrate 3, and the reflection layer 4, refer to descriptions in the embodiments shown in FIG. 2 to FIG. 8.

Figure 13:
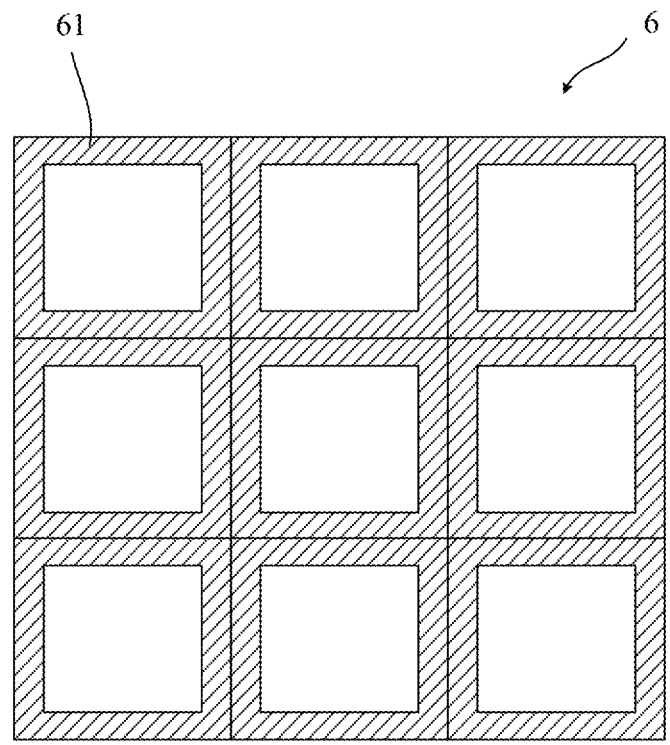
FIG. 13 is a schematic diagram of an isolation layer according to an embodiment of this application.

The isolation layer 6 is disposed between the reflection layer 4 and the substrate 3. Referring to FIG. 13, the isolation layer 6 includes a plurality of grid boxes 61, and the grid boxes 61 are in a one-to-one correspondence with the imaging units 31. The grid boxes 61 are made of an opaque material and are configured to isolate light received by the different imaging units 31. The grid boxes may be made of a rigid material, or may be made of a flexible material. Optionally, a transparent polymer is filled inside each grid box 61. Specifically, the grid box may be imprinted on a black opaque thin polymer film material by using an imprinting technology. A density of the grid box, a density of a light transmission area, and a density of the imaging unit are the same. The transparent polymer is filled inside the grid box and is solidified. The reflection layer 4 may be a metal film formed by depositing metal on a bottom surface of the transparent polymer.

In this embodiment, light received by each imaging unit is isolated by using the grid box. In this way, light that enters the imaging unit from the reflection layer may be constrained, so that the reflected light does not enter an area in which the imaging unit is not located on the substrate, to prevent mutual crosstalk between light of different imaging units.

Figure 14:
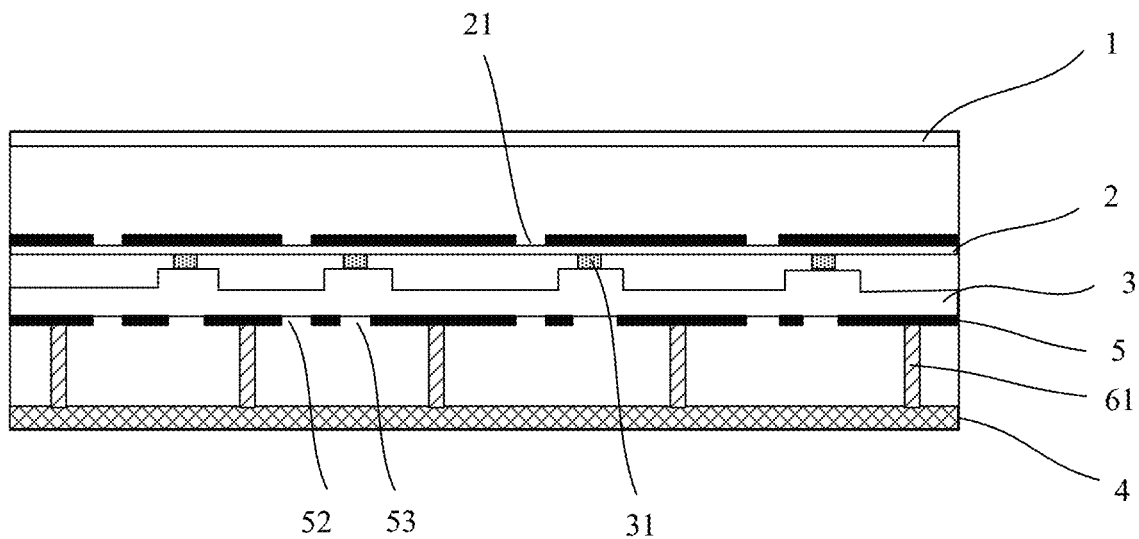
FIG. 14 is another schematic diagram of a screen module according to an embodiment of this application.

Specifically, referring to FIG. 14, another embodiment of a screen module provided in this application includes an external screen 1, a first light blocking layer 2, a substrate 3, a reflection layer 4, a second light blocking layer 5, and an isolation layer 6 that are disposed from outside to inside. For specific descriptions of the external screen 1, the first light blocking layer 2, the substrate 3, the reflection layer 4, and the second light blocking layer 5, refer to descriptions in the embodiment shown in FIG. 2 to FIG. 10.

The isolation layer 6 is disposed between the reflection layer 4 and the second light blocking layer 5. For specific descriptions of the isolation layer 6 and a grid box 61, refer to corresponding descriptions in the embodiments shown in FIG. 12 and FIG. 13.

In this embodiment, light received by each imaging unit is isolated by using the grid box. In this way, light that enters the imaging unit from the reflection layer may be constrained, so that the reflected light does not enter an area in which the imaging unit is not located on the substrate, to prevent mutual crosstalk between light of different imaging units.

Figure 15:
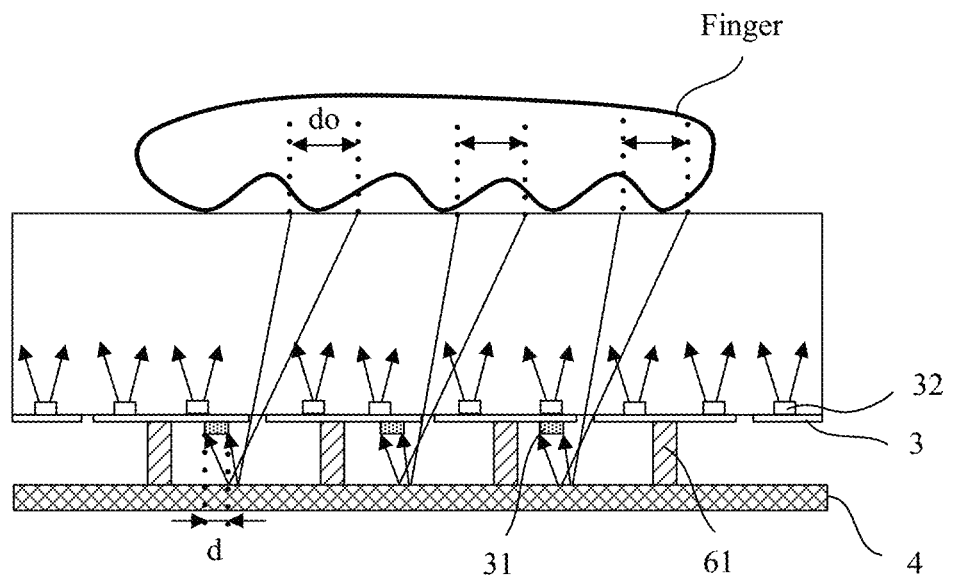
FIG. 15 is another schematic diagram of an imaging principle according to an embodiment of this application.

Referring to FIG. 15, it can be learned according to an aperture imaging principle that a relationship between a size of an object detection area and a size of an imaging unit is as follows: do=d*M, where do is the size of the object detection area, d is the size of the imaging unit, and M is an object image distance ratio. The object image distance ratio is a ratio of an object distance to an image distance. In brief, the object distance is a distance from an object to an aperture, and the image distance is a distance from an image to the aperture. When the size of the imaging unit is small enough, an object detection area corresponding to each imaging unit does not overlap. It should be noted that the size of the imaging unit may be set based on an actual requirement. For example, considering that a film is attached to an external screen, causing an increase in the object image distance ratio, in this case, the size of the imaging unit needs to be designed to be smaller, to avoid overlapping of object detection areas.

A size of an image of aperture imaging is affected by the object image distance ratio. The following describes a density and the size of the imaging unit.

For an object on a surface of the external screen, a distance d1 from a first light blocking layer to an outer surface of the external screen may be used as an object distance. For an image distance, because a reflection layer 4 is disposed, the image distance is a sum of a distance from a second aperture of a second light blocking layer and a distance from the reflection layer 4 to an imaging unit 31. Therefore, a distance d2 from the second light blocking layer to the reflection layer may be used as a half of the image distance. A distance from the first light blocking layer to the second light blocking layer may be designed to be several micrometers. In this way, an aperture structure includes a first aperture of the first light blocking layer and the second aperture of the second light blocking layer. When the object distance and the image distance are calculated, impact of a distance between the foregoing two apertures on imaging may be ignored. The distance from the first light blocking layer to the outer surface of the external screen is denoted as d1. The distance from the second light blocking layer to the reflection layer is denoted as d2. A ratio of d1 to d2 usually ranges from 1 to 40, and a size of an image formed through the aperture imaging can meet an imaging requirement. An example in which the object image distance ratio is 10:1, the distance from the first light blocking layer to the outer surface of the external screen is 1000 micrometers (μm), and the distance from the reflection layer to the imaging unit is 50 μm is used below. A formula for calculating the size of the imaging unit, a resolution, and the object image distance ratio is as follows: size of an imaging unit=distance between imaging units/object image distance ratio.

For example, the resolution is 500 PPI, indicating that there are 500 imaging units per inch. An inch is about 25.4 millimeters (mm), and a distance between imaging units may be calculated as follows: 25.4/500=50.8 μm. An active area of the image unit is circular, and a diameter of the active area may be 50.8/10=5.08 μm. In other words, an imaging unit array including imaging units whose sizes are less than or equal to 5.08 μm may implement the resolution of 500 PPI. When the active area of the image unit is of a square, both a length and a width of the active area are less than or equal to 5.08 μm. A higher density of the imaging unit indicates a higher resolution and clearer imaging.

It should be noted that, because there are a large quantity of units in the array, due to limited space, not all units can be drawn. The light emitting pixel array, the imaging unit array, the first aperture array, or the second aperture array shown in the accompanying drawings in this specification is an example, and is used to describe the array provided in this application, and should not be understood as a limitation on the embodiments of this application.

Figure 16:
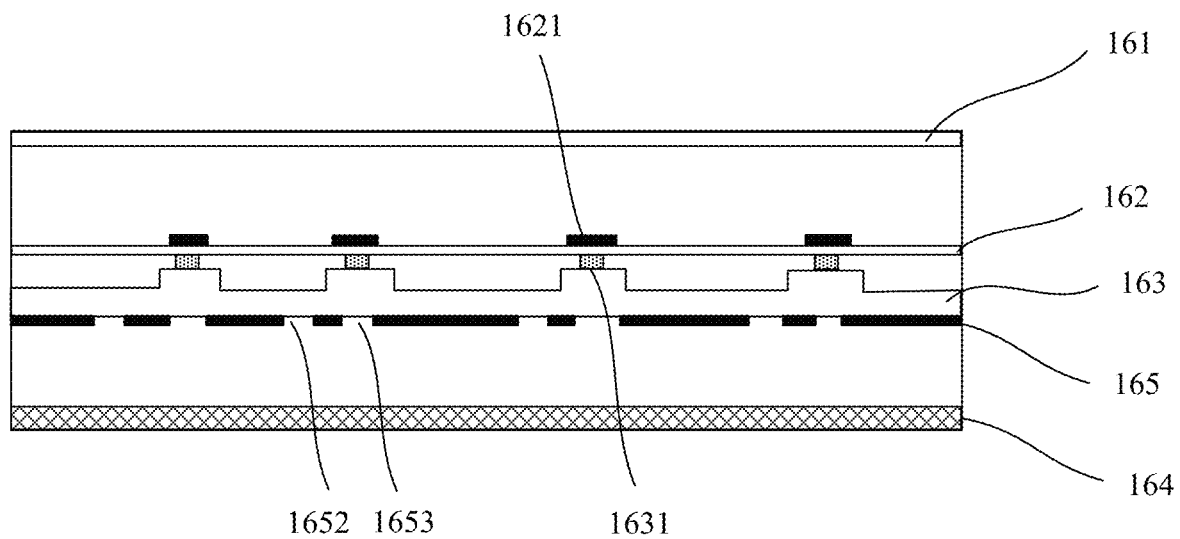
FIG. 16 is another schematic diagram of a screen module according to an embodiment of this application.

Referring to FIG. 16, another screen module provided in this application includes an external screen 161, a first light blocking layer 162, a substrate 163, a reflection layer 164, and a second light blocking layer 165 that are disposed from outside to inside.

An imaging unit array is disposed on the substrate 163, the imaging unit array includes a plurality of imaging units 1631, and a photosensitive surface of the imaging unit 1631 is opposite to the reflection layer 164.

The first light blocking layer 162 includes a buffer layer and a lightproof material 1621 covering a surface of the buffer layer, and a light blocking area including the lightproof material 1621 is used to block light emitted from the outside to the imaging unit 1631. The second light blocking layer 165 is disposed between the substrate 163 and the reflection layer 164.

Figure 17:
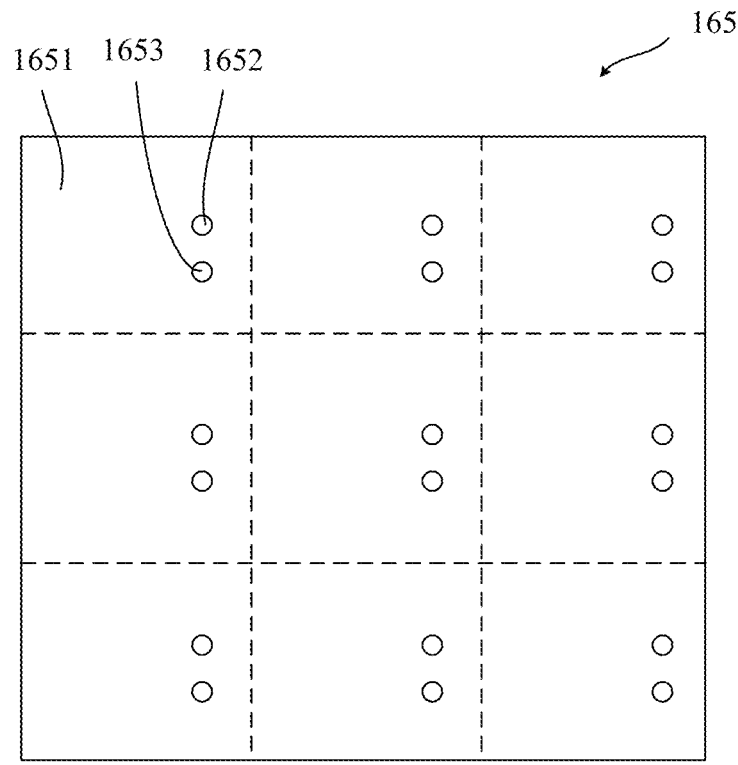
FIG. 17 is another schematic diagram of a second light blocking layer according to an embodiment of this application.

As shown in FIG. 17, the second light blocking layer 165 includes a light transmission area array, each light transmission area 1651 in the light transmission area array includes a first aperture 1652 and a second aperture 1653, the first aperture 1652 is used to allow light reflected by an object outside the external screen to the reflection layer 164 to pass through, and the second aperture 1653 is used to allow light reflected by the reflection layer 164 to the imaging unit 1631 to pass through. Specifically, the second aperture 1653 may be provided at a position facing the imaging unit 1631.

The reflection layer 164 is configured to reflect, to the imaging unit 1631, the light passing through the first aperture 1652.

For specific descriptions of the external screen 161, the first light blocking layer 162, the substrate 163, the reflection layer 164, the second light blocking layer 165, and the imaging unit 1631, refer to corresponding descriptions in the foregoing embodiments. The first aperture 1652 is similar to the third aperture 52 in the embodiment shown in FIG. 10a, and the second aperture 1653 is similar to the fourth aperture 53 in the embodiment shown in FIG. 10b.

In this embodiment, when ambient light irradiates the object outside the external screen 1, light scattered by the object passes through the first aperture 1652 of the first light blocking layer 165 to reach the internal reflection layer 164, then is reflected by the reflection layer 164, and passes through the second aperture 1653 to reach the imaging unit 1631. The imaging unit 1631 receives the light of the object for imaging. In this way, each imaging unit may form a partial image of the object based on a part of the light reflected by the object, and the imaging unit array may form a high-definition image of the entire object based on partial images of the object formed by various imaging units. When the object is a finger, the screen module may obtain a fingerprint of the finger, to perform a fingerprint recognition function. In addition, the screen module may further implement functions such as gesture recognition, proximity detection, and ambient light detection. Moreover, the light blocking area of the first light blocking layer can block the light emitted from the outside to the imaging unit 1631.

In an optional embodiment, the screen module further includes a light emitting pixel array disposed on the substrate, and the light emitting pixel array includes a plurality of light emitting pixels. For a light emitting pixel, refer to descriptions of the light emitting pixel in the foregoing embodiments. When light of the light emitting pixel array irradiates the object outside the external screen, the object can scatter more light, so that the imaging unit can receive more light, thereby achieving a better imaging effect.

Figure 18:
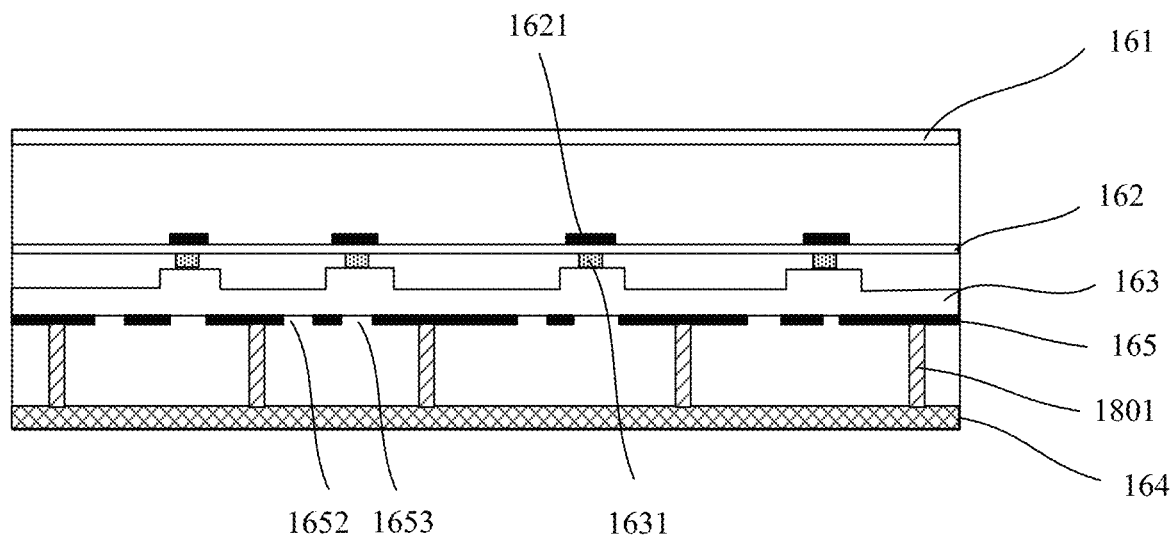
FIG. 18 is another schematic diagram of a screen module according to an embodiment of this application.

Referring to FIG. 18, in another optional embodiment, an isolation layer is disposed between the reflection layer 164 and the second light blocking layer 165, and grid boxes 1801 of the isolation layer are in a one-to-one correspondence with light transmission areas 1651 (see FIG. 17). The grid boxes 1801 are made of an opaque material and are configured to isolate light received by the different imaging units 1631. Optionally, a transparent polymer is filled inside each grid box 1801. For a specific description of the grid box 1801, refer to a description of the grid box 61 in the foregoing embodiment.

In another optional embodiment, a ratio of a distance from the first light blocking layer 162 to the outer surface of the external screen 161 to a distance from the second light blocking layer 165 to the reflection layer 164 ranges from 1 to 40.

Figure 19:
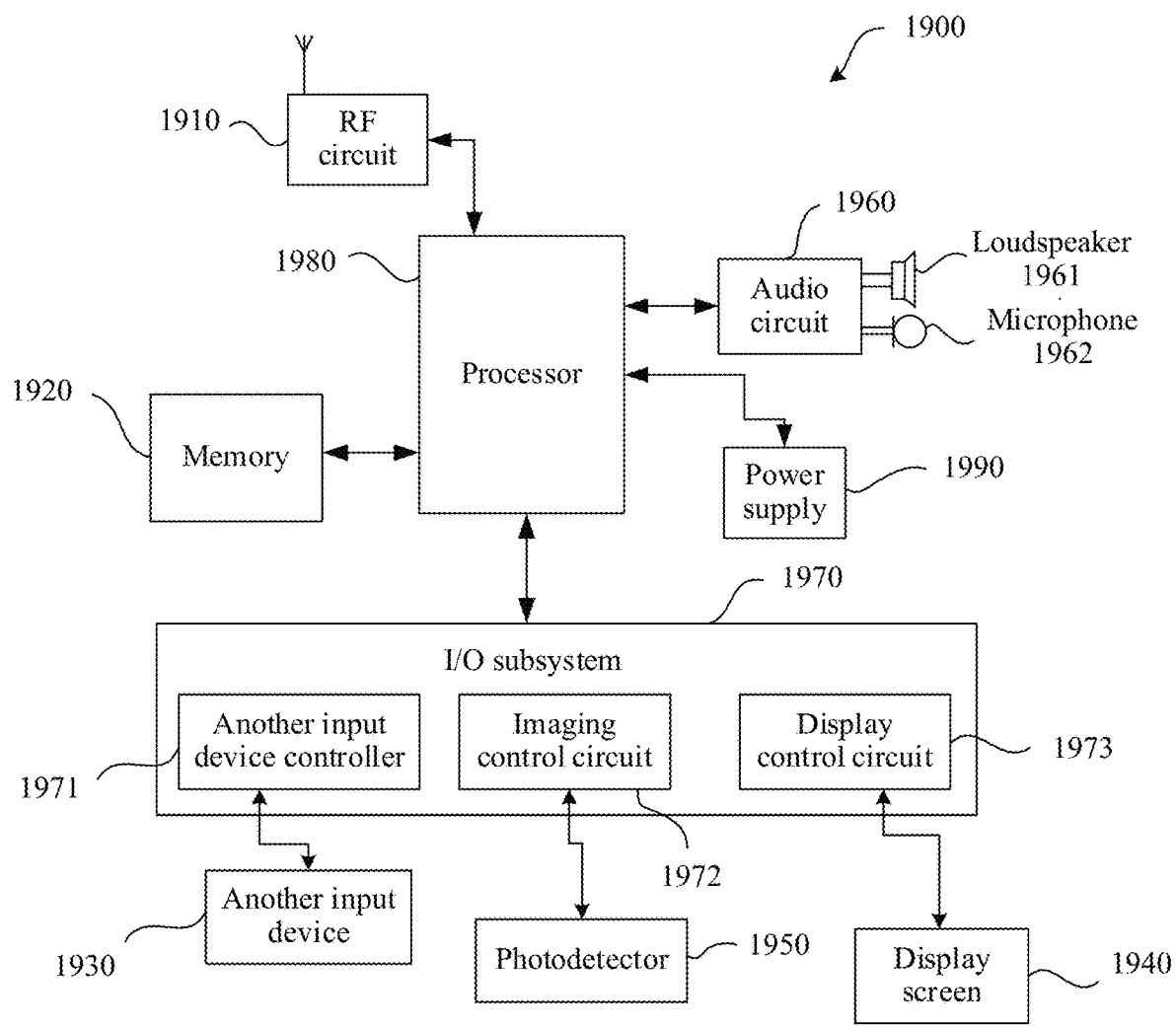
FIG. 19 is a schematic diagram of an electronic device according to an embodiment of this application.

This application further provides an electronic device 1900. A mobile phone is used as an example of the electronic device. FIG. 19 is a block diagram of a partial structure of a mobile phone 1900 related to the embodiments of this application. Referring to FIG. 19, the mobile phone 1900 includes components such as a radio frequency (RF) circuit 1910, a memory 1920, another input device 1930, a display screen 1940, a photodetector 1950, an audio circuit 1960, and an input/output (I/O) subsystem 1970, a processor 1980, and a power supply 1990. A person skilled in the art may understand that a structure of the mobile phone shown in FIG. 19 does not constitute a limitation on the mobile phone. The mobile phone may include more or fewer components than those shown in the figure, or combine some components, or split some components, or have different component arrangements. The screen module provided in the embodiments of the present invention may be further applied to a terminal device besides the mobile phone, for example, a notebook computer, a wearable device, an AI device, a self-service sales terminal, or a self-service payment terminal. In addition, the screen module provided in the embodiments of the present invention may also be applied to another computer device besides the terminal device, for example, a server.

The following specifically describes the constituent components of the mobile phone 1900 with reference to FIG. 19.

The RF circuit 1910 may be configured to receive and send a signal in an information receiving and sending process or a call process. In particular, after receiving downlink information from a base station, the RF circuit 910 sends the downlink information to the processor 1980 for processing. In addition, the RF circuit 910 sends related uplink data to the base station. Usually, the RF circuit includes but is not limited to an antenna, at least one amplifier, a transceiver, a coupler, a low noise amplifier (LNA), a duplexer, and the like. In addition, the RF circuit 1910 may further communicate with a network and another device through wireless communication. Any communications standard or protocol may be used for the wireless communication, and includes but is not limited to a global system for mobile communications (GSM), a general packet radio service (GPRS) system, a code division multiple access (CDMA) system, a wideband code division multiple access (WCDMA) system, a long term evolution (LTE) system, an email, a short message service (SMS), and the like.

The memory 1920 may be configured to store a software program and a module. The processor 1980 runs the software program and the module that are stored in the memory 1920, to execute various function applications of the mobile phone 1900 and perform data processing. The memory 1920 may mainly include a program storage area and a data storage area. The program storage area may store an operating system, an application required for at least one function (such as a sound playback function or an image playback function), and the like. The data storage area may store data (such as audio data or a phone book) created according to use of the mobile phone 1900, and the like. In addition, the memory 1920 may include a high speed random access memory, and may further include a nonvolatile memory, for example, at least one magnetic disk storage device, a flash memory device, or another volatile solid-state storage device.

The another input device 1930 may be configured to: receive input digit or character information, and generate a keyboard signal input related to user settings and function control of the mobile phone 1900. Specifically, the another input device 1930 may include but is not limited to one or more of a physical keyboard, a function key (such as a volume control key or an on/off key), a trackball, a mouse, a joystick, an optical mouse (the optical mouse is a touch-sensitive surface that does not display a visual output, or an extension of a touch-sensitive surface including a touchscreen), and the like. The another input device 1930 is connected to another input device controller 1971 of the I/O subsystem 1970, and exchanges a signal with the processor 1980 under control of the another input device controller 1971.

The display screen 1940 may be configured to display information entered by a user or information provided to a user, and various menus of the mobile phone 1900, and may further receive a user input. Specifically, the display screen 1940 includes but is not limited to the screen module provided in the foregoing embodiments. The user may perform an operation on or near the display screen 1940 based on content displayed on the display screen 1940 (the displayed content includes but is not limited to a soft keyboard, a virtual mouse, a virtual key, an icon, and the like). After detecting the operation on or near the display screen 1940, the display screen 1940 transmits the operation to the processor 1980 by using the I/O subsystem 1970, to determine the user input. Then, the processor 1980 provides a corresponding visual output on a display panel 1941 by using the I/O subsystem 1970 based on the user input.

The audio circuit 1960, a loudspeaker 1961, and a microphone 1962 may provide an audio interface between the user and the mobile phone 1900. The audio circuit 1960 may transmit, to the loudspeaker 1961, a signal converted from received audio data, and the loudspeaker 1961 converts the signal into a sound signal for outputting. In addition, the microphone 1962 converts a collected sound signal into a signal, and the audio circuit 1960 converts the signal into audio data after receiving the signal, and then outputs the audio data to the RF circuit 1910 to send the audio data to, for example, another mobile phone, or outputs the audio data to the memory 1920 for further processing.

The I/O subsystem 1970 is configured to control an external input/output device, and may include the another device input controller 1971, an imaging control circuit 1972, and a display control circuit 1973. Optionally, one or more another input device controllers 1971 receive a signal from the another input device 1930 and/or send a signal to the another input device 1930, and the another input device 1930 may include a physical button (a press button, a rocker button, or the like), a dial pad, a slider switch, the joystick, a click scroll wheel, and the optical mouse (the optical mouse is the touch-sensitive surface that does not display the visual output, or the extension of the touch-sensitive surface including the touchscreen). It should be noted that the another input control device controller 1971 may be connected to any one or more of the foregoing devices. The display control circuit 1973 in the I/O subsystem 1970 receives a signal from the display screen 1940 and/or sends a signal to the display screen 1940. After the display screen 1940 detects the user input, the display control circuit 1973 converts the detected user input into interaction with a user interface object displayed on the display screen 1940, to implement human-computer interaction. The imaging control circuit 1972 may control one or more photodetectors 1950 to be turned on or off.

As a control center of the mobile phone 1900, the processor 1980 connects various parts of the entire mobile phone by using various interfaces and lines, and performs various functions of the mobile phone 1900 and processes data by running or executing the software program and/or the module stored in the memory 1920 and by invoking data stored in the memory 1920, to perform overall monitoring on the mobile phone. Optionally, the processor 1980 may include one or more processing units. Optionally, an application processor and a modem processor may be integrated into the processor 1980. The application processor mainly processes an operating system, a user interface, an application, and the like. The modem processor mainly processes wireless communication. It may be understood that the foregoing modem processor may not be integrated into the processor 1980.

The mobile phone 1900 further includes the power supply 1990 (such as a battery) that supplies power to each component. Optionally, the power supply may be logically connected to the processor 1980 by using a power supply management system, thereby implementing functions such as charging management, discharging management, and power consumption management by using the power supply management system. Although not shown, the mobile phone 1900 may further include a camera, a Bluetooth module, a sensor, and the like. Details are not described herein.

The screen module provided in this application is described in detail in the foregoing description. A person of ordinary skill in the art can make variations to this application in terms of the specific implementations and application scopes according to the ideas of the embodiments of this application. Therefore, the specification shall not be construed as a limitation to the present invention.

What is claimed is:

1. A screen module, comprising:
    an external screen, a first light blocking layer, a substrate, and a reflection layer that are disposed from outside to inside;
    an imaging unit array disposed on the substrate, the imaging unit array comprising a plurality of imaging units, and
    a photosensitive surface of each imaging unit is opposite to the reflection layer;
    a first aperture array disposed on the first light blocking layer, the first aperture array comprises a plurality of first apertures, and each first aperture is used to allow light reflected by an object outside the external screen to the reflection layer to pass through; and
    a second light blocking layer disposed between the substrate and the reflection layer, the second light blocking layer comprises a light transmission area array including a plurality of light transmission areas, and each light transmission area in the light transmission area array comprises a third aperture and a fourth aperture;
    wherein:
        the reflection layer is configured to reflect, to the imaging unit, the light passing through the first aperture;
        the first light blocking layer is in contact with the substrate
        each third aperture is aligned with a corresponding one of the first apertures, and the third aperture is used to allow the light passing through the first aperture to pass through; and
        each fourth aperture is used to allow the light reflected by the reflection layer to the corresponding one of the imaging units to pass through.

2. The screen module according to claim 1, wherein the screen module further comprises a light emitting pixel array disposed on the substrate, and the light emitting pixel array comprises a plurality of light emitting pixels; and
    a second aperture array is further disposed on the first light blocking layer, the second aperture array comprises a plurality of second apertures, and each second aperture corresponds to one of the light emitting pixels, and is used to allow light emitted by the corresponding light emitting pixel to the external screen to pass through.

3. The screen module according to claim 2, further comprising:
    an isolation layer disposed between the reflection layer and the substrate, and grid boxes of the isolation layer are in a one-to-one correspondence with the imaging units; and
    the grid boxes are made of an opaque material and are configured to isolate light received by the imaging units.

4. The screen module according to claim 3, further comprising a transparent polymer filled inside each grid box.

5. The screen module of claim 2, wherein the first apertures are between the second apertures in both a first direction and a second direction perpendicular to the first direction.

6. The screen module of claim 2, wherein the light emitting pixels are between the imaging unit in both a first direction and a second direction perpendicular to the first direction.

7. The screen module according to claim 1, wherein the light emitting pixel is at least one of an organic light emitting diode (OLED), a quantum dot light emitting diode (QLED), or a micro light emitting diode (microLED), and the imaging unit is a photodetector.

8. The screen module according to claim 1, wherein the substrate is a thin-film transistor (TFT) substrate, and a material of the TFT substrate is resin or glass.

9. The screen module according to claim 1, wherein the first light blocking layer comprises a buffer layer and a thin metal film covering a surface of the buffer layer, the buffer layer is made of a polymer material or silicon dioxide.

10. The screen module according to claim 1, wherein a shape of the first aperture is a circle, and a diameter of the first aperture ranges from 2 micrometers to 30 micrometers.

11. The screen module according to claim 1, wherein a ratio of a distance from the first light blocking layer to the external screen to a distance from the second light blocking layer to the reflection layer ranges from 1 to 40.

12. The screen module according to claim 1, wherein a density of each imaging unit on the substrate is greater than 200 pixels per inch (PPI).

13. An electronic device, wherein the electronic device comprises the screen module according to claim 1.

14. The screen module of claim 1, wherein the substrate has raised bumps on a side facing the reflection layer, and the imaging unit array is mounted on the raised bumps.

15. A screen module, comprising:
an external screen, a first light blocking layer, a substrate, a second light blocking layer, and a reflection layer that are disposed from outside to inside;
an imaging unit array disposed on an outer surface of the substrate, the imaging unit array comprises a plurality of imaging units, and a photosensitive surface of each imaging unit is opposite to the reflection layer;
a surface of the first light blocking layer has a light blocking area comprising a non-light transmission material, and the light blocking area is used to block light emitted from the outside to each imaging unit;
the second light blocking layer is disposed between the substrate and the reflection layer, the second light blocking layer comprises a light transmission area array including a plurality of light transmission areas, each light transmission area in the light transmission area array comprises a first aperture and a second aperture, the first aperture is used to allow light reflected by an object outside the external screen to the reflection layer to pass through, and the second aperture is used to allow light reflected by the reflection layer to the imaging unit to pass through; and
the reflection layer is configured to reflect, to the imaging unit, the light passing through the first aperture.

16. The screen module according to claim 15, wherein the screen module further comprises a light emitting pixel array disposed on the substrate, and the light emitting pixel array comprises a plurality of light emitting pixels.

17. The screen module according to claim 15, further comprising an isolation layer disposed between the reflection layer and the second light blocking layer, and grid boxes of the isolation layer are in a one-to-one correspondence with the light transmission areas; and
the grid boxes are made of an opaque material and are configured to isolate light received by the imaging units.

18. The screen module according to claim 15, wherein a ratio of a distance from the first light blocking layer to the external screen to a distance from the second light blocking layer to the reflection layer ranges from 1 to 40.

19. The screen module of claim 15, wherein the first apertures are between the second apertures in both a first direction and a second direction perpendicular to the first direction.

20. The screen module of claim 15, wherein the first apertures are between the second apertures in both a first direction and a second direction perpendicular to the first direction.

* * * * *